US012781045B2

(12) United States Patent
Yang et al.

(10) Patent No.: US 12,781,045 B2
(45) Date of Patent: Nov. 3, 2026

(54) BIODEGRADABLE AND COMPOSTABLE POLYMERS FOR RIGID PACKAGING AND PROCESSES FOR PREPARING SAME

(71) Applicant: CLEAN FILTER LLC, San Francisco, CA (US)

(72) Inventors: Helen Yang, San Francisco, CA (US); Simon Xiaoming Yang, Shanghai (CN); Luqian Weng, Shenzhen (CN)

(73) Assignee: Clean Filter LLC, San Francisco, CA (US)

( * ) Notice: Subject to any disclaimer, the term of this patent is extended or adjusted under 35 U.S.C. 154(b) by 752 days.

(21) Appl. No.: 17/707,398

(22) Filed: Mar. 29, 2022

(65) Prior Publication Data

US 2022/0315756 A1 Oct. 6, 2022

Related U.S. Application Data

(60) Provisional application No. 63/168,422, filed on Mar. 31, 2021.

(51) Int. Cl.

| | |
|---|---|
| ***C08L 67/04*** | (2006.01) |
| ***B65D 65/46*** | (2006.01) |
| ***C08J 3/00*** | (2006.01) |
| *B29C 45/00* | (2006.01) |
| *B29K 67/00* | (2006.01) |
| *B29K 511/14* | (2006.01) |
| *B29L 31/00* | (2006.01) |

(52) U.S. Cl.

CPC ............ *C08L 67/04* (2013.01); *B65D 65/466* (2013.01); *C08J 3/005* (2013.01); *B29C 45/0001* (2013.01); *B29K 2067/04* (2013.01); *B29K 2511/14* (2013.01); *B29K 2995/006* (2013.01); *B29L 2031/712* (2013.01); *C08J 2367/04* (2013.01); *C08J 2497/02* (2013.01); *C08L 2201/06* (2013.01); *C08L 2203/30* (2013.01); *C08L 2205/16* (2013.01)

(58) Field of Classification Search

CPC .............................. C08L 67/04; B65D 65/466

See application file for complete search history.

(56) References Cited

U.S. PATENT DOCUMENTS

| | | | | |
|---|---|---|---|---|
| 2007/0123611 | A1 * | 5/2007 | Hirose .................... | C08L 67/04 524/9 |
| 2013/0294970 | A1 | 11/2013 | Simon et al. | |

FOREIGN PATENT DOCUMENTS

| | | | |
|---|---|---|---|
| CN | 102268180 A | * | 12/2011 |
| JP | 2000129143 A | * | 5/2000 |
| JP | 2002088264 A | * | 3/2002 |
| JP | 2006045366 A | * | 2/2006 |
| WO | WO 03/035753 | | 5/2003 |
| WO | WO 2021/177834 | | 9/2021 |
| WO | WO 2022/008484 | | 1/2022 |

OTHER PUBLICATIONS

Stanislaw et al., “Novel Biorenewable Composites Based on Poly (3-hydroxybutyrate-co-3-hydroxyvalerate) with Natural Fillers”, Journal of Polymers and The Environment, Springer New York LLC, US, vol. 27, No. 4, Feb. 7, 2019, pp. 803-815.

Krishnaprasad et al., “Mechanical and Thermal Properties of Bamboo Microfibril Reinforced Polyhydroxybutyrate Biocomposites”, Journal Of Polymers And The Environment; Formerly: ‘Journal Of Environmental Polymer Degradation’, Kluwer Academic Publishers—Plenum Publishers, NE, vol. 17, No. 2, Aug. 26, 2009, pp. 109-114.

Singh et al., “Renewable resource based biocomposites from natural fiber and polyhydroxybutyrate-co-valerate (PHBV) bioplastic”, Composites Part A, Elsevier, Amsterdam, NL, vol. 39, No. 5, May 1, 2008, pp. 875-886.

Search Report dated Jul. 21, 2022 issued in International Patent Application No. PCT/2022/022344, 14 pages.

Lau et al., Science 369, 1455-1461 (2020) Sep. 18, 2020.

M. Suzuki et al. Polymer Journal (2021) 53:47-66; https://doi.org/10.1038/s41428-020-00396-5.

T. Goto et al. Degradation of Polylactic acid Using Sub-Critical Water for Compost Polymers 2020, 12, 2434; doi: 10.3390/polym12112434 www.mdpi.com/joumal/polymers pp. 1-14.

T.R. Shamala et al., Braz J Microbiol Jul.-Sep. 2012; 43(3): 1094-1102 pp. 1-11.

Bauxite in Malaysia: The Environmental cost of Mining Jan. 19, 2016, pp. 1-12.

M. Jacoby, Why glass recycling in the US is broken, Feb. 11, 2019; pp. 1-8.

A. Hogan et al. Georgetown Environmental Law Review; Apr. 17, 2019 A Polymer Problem: How Plastic Production and Consumption is Polluting our Oceans: pp. 1-7.

Environmental Update #12; Published by the Hazardous Substance Research Centers/South & Southwest Outreach Program; Jun. 2003; pp. 1-4.

(Continued)

*Primary Examiner* — Vickey Nerangis

(74) *Attorney, Agent, or Firm* — Foley & Lardner LLP

(57) ABSTRACT

A biodegradable bioplastic composition of from 80 wt % to 95 wt % of a polymer having one or more thermoplastic polyester polyhydroxyalkanoates (PHA) and from 5 wt % to 20 wt % an organic dispersed within the polymer. The biodegradable bioplastic composition is devoid of petrochemically derived components, fossil fuel derived components, processing aids, and plasticizer additives. A process is also disclosed for preparing the biodegradable bioplastic composition. The process involves compounding one or more thermoplastic polyester polyhydroxyalkanoates (PHA) and an organic to form a mixture and homogenizing the mixture. Homogenizing includes feeding the mixture to a first extruder and extruding the mixture to form a composite composition and feeding the composite composition to a second extruder and extruding the composite composition to form the biodegradable bioplastic composition.

18 Claims, 2 Drawing Sheets

(56) References Cited

OTHER PUBLICATIONS

Green Cities; Fact Sheet: Single Use Plastics; Mar. 29, 2018, pp. 1-5.
N. Israni et al. Woodhead Publishing Series in Biomaterials 2018, pp. 371-409.
Su Yean Ong et al. Degradation of Polyhydroxyalkanoate (PHA): a Review; Journal of Siberian Federal University. Biology 2017 10(2): pp. 211-225.

* cited by examiner

BIODEGRADABLE AND COMPOSTABLE POLYMERS FOR RIGID PACKAGING AND PROCESSES FOR PREPARING SAME

PRIORITY

This application is related to and claims priority to U.S. Provisional Patent Application No. 63/168,422 filed Mar. 31, 2021, which is incorporated herein by reference.

FIELD OF THE INVENTION

The present disclosure relates generally to non-petrochemically derived compositions for rigid packaging formed from bioplastics and organic matter. In particular, the present disclosure relates to compositions including polyhydroxyalkanoates (PHA) and organics to form a composite material that is eco-friendly, free of additives, biodegradable, industrially compostable, 100% plant derived, impart a reduction of acid upon degradation, and comprise unique mechanical properties.

DISCUSSION OF RELATED ART

There is a growing interest in eco-friendly packaging as an alternative to petroleum-based plastic or other heavier packaging materials such as glass, which incur a larger carbon footprint. Plastic packaging is the main contributor to overall plastic production and disposal. [See, e.g., *Fact Sheet: Single Use Plastics*, https://www.earthday.org/fact-sheet-single-use-plastics/, Earthday.org (2021).] Conventional petroleum-based plastic packaging options are unsustainable, because not only do they generate tons of waste by accumulating in landfills or polluting the environment when improperly disposed, but they also consume a nonrenewable oil resource and pollute the environment during the crude oil refinement process. [See, e.g., W. W. Y. Lau et al., Science 10.1126/science.aba9475 (2020); and Hazardous Substance Research Centers/South & Southwest Outreach Program, *Environmental Update* #12, https://cfpub.epa.gov/ncer_abstracts/index.cfm/fuseaction/display.files/fileID/14522 (2003).] The accumulation of plastic waste and pollution is a particularly acute problem for single-use, disposable plastic products or small objects that are too small to be recycled regardless of the material. And not all plastics are recyclable, and for even those that are recyclable they may not ever make it to the recycling facility or can only be recycled a limited number of times. [See, e.g., Hogan, A. and Steinbach A. *A Polymer Problem: How Plastic Production and Consumption is Polluting our Oceans*, Georgetown Environmental Law Review, https://www.law.georgetown.edu/environmental-law-review/blog/a-polymer-problem-how-plastic-production-and-consumption-is-polluting-our-oceans/ (2019).]

Such packaging may be used in many industries including food and beverage science, healthcare, hospitality, pharmaceuticals, personal care, and health and beauty, among others. In addition to seeking out eco-friendly consumer product packaging, the packaging must be also be fully functional to replace existing non-sustainable options. What is sought, in other words, is that the container must be rigid and non-porous to hold the liquid or solid form to be contained and must also be non-reactive to provide a safe stable barrier.

Currently available packaging alternatives only partially address the sustainability issue. Glass is recyclable, but fragile & heavy (therefore incurring a hefty carbon footprint during shipping and often requiring excess secondary packaging materials to prevent breakage)—and even then, only about 33% of glass is recycled in the US. [See, e.g., Jacoby, *Why glass recycling in the US is broken*, American Chemical Society Chemical & Engineering News, https://cen.acs.org/materials/inorganic-chemistry/glass-recycling-US-broken/97/i6 (2021).] Aluminum is likewise recyclable and is much lighter than glass, but it is relatively expensive, easily dented or scratched, and requires nonrenewable strip mining of ores that can leave behind waste and pollution. [See, e.g., *Bauxite in Malaysia: The environmental cost of mining*, BBC, https://www.bbc.com/news/world-asia-35340528 (2016).] Current plant-based compostable packaging options (e.g., vessels made out of kraft paper, wood chips) are not waterproof and can only be used with anhydrous products—which limits their application in much of the food, healthcare, and personal care industries—unless lined with a waterproof film that often renders the product non-compostable and/or non-recyclable. Virgin bioplastics (e.g., polyethylene plastics made from sugarcane) may mitigate the crude oil pollution issue, but do not resolve the disposal issue at the end of lifecycle because these products are often recyclable but still not biodegradable. A final example is reclaimed plastic, such as post-consumer recycled (PCR) and ocean-waste or ocean-bound plastic, which support a circular economy—however, these materials require the addition of virgin plastic to maintain structural or color integrity when manufacturing new products. Therefore, reclaimed plastics engender additional petroleum-based virgin plastic production and cannot be infinitely recycled, eventually adding to the landfills.

Moreover, even the currently available compostable plastics are problematic. These include polybutylene succinate (PBS), poly(butylene succinate-co-butylene adipate) (PBSA), polycaprolactone (PCL), polybutyrate adipate terephthalate (PBAT), and aliphatic-aromatic copolyesters (AACs), which are indeed biodegradable yet still rely on fossil fuel sources. [See, e.g., Muthuraj, R. et al. *Biodegradable compatibilized polymer blends for packaging applications: A literature review*, J Applied Polymer Science, https://doi.org/10.1002/app.45726, https://onlinelibrary.wiley.com/doi/10.1002/app.45726 (2017).] Thus, existing materials are not fully sustainable and do not satisfy the need for a cleanly synthesized raw material that can biodegrade into safe, non-toxic components instead of accumulating in landfills or needing to be sorted and recycled.

Clearly a need exists for container packaging having both (i) a clean composition and manufacturing process and (ii) an environmentally-friendly end of life disposal solution. In an attempt to achieve these properties, conventional techniques have turned to biodegradable fermentation-derived polymers such as pure polylactic acid (PLA) or polyhydroxyalkanoates (PHA), which are synthesized cleanly via bacterial fermentation of a carbohydrate source without the need for fossil fuels, a process that can even begin with organic waste for full circularity and yield useful enzymatic byproducts during synthesis. [See, e.g., Full Cycle Bioplastics, *Full Cycle PHA: the future of plastic*, https://fullcyclebioplastics.com/solutions/ (2021); and Shamala, T. R. et al., *Agro-industrial residues and starch for growth and co-production of polyhydroxyalkanoate copolymer and α-amylase by Bacillus sp*, CFR-67" Braz J Microbiol 10.1590/S1517-838220120003000036, https://www.ncbi.nlm.nih.gov/pmc/articles/PMC3768888/ (2012).]

Pure PLA and PHA are readily biodegradable and can decompose safely in an industrial composting environment instead of accumulating in landfills or contaminating traditional recycling streams. [See, e.g., Goto, T. et al., *Degradation of Polylactic acid Using Sub-Critical Water for Compost*, Polymers, https://www.mdpi.com/2073-4360/12/11/2434/htm (2020).] Such bioplastic polymers have therefore seen a huge uptick as raw materials for compostable films and bags, especially PLA packaging in the food and agricultural industries. [See, e.g., Ong, S. Y. et al., *Degradation of Polyhydroxyalkanoate (PHA): A Review,* J Siberian Federal University (2017); Compostable Plastics 101, California Organics Recycling Council (2011); and Meereboer, K. W. et al., *Review of recent advances in the biodegradability of polyhydroxyalkanoate (PHA) bioplastics and their composites*, Green Chemistry (2020).] These single-use thin films are industrially compostable, thus avoiding landfill accumulation and the need to recycle.

However, when it comes to manufacturing thicker rigid packaging, such as in the range of from 0.1 mm to 10 mm wall thickness that can endure a years-long shelf life and safely contain liquid products, drawbacks arise with using pure PLA. This is because PLA is fragile in the 55-65° C. temperature range (near its glass transition temperature), which especially limits its applications as packaging for hot-filled cosmetics and beverages. [See, e.g., Rydz, J. et al., *3D-Printed Polyester-Based Prototypes for Cosmetic Applications—Future Directions at the Forensic Engineering of Advanced Polymeric Materials*, https://www.ncbi.nlm.nih.gov/pmc/articles/PMC6470545/ Materials (2019).] Furthermore, pure PLA can take months to decompose under industrial composting conditions and can generate acidic byproducts that decrease the pH of soil or compost. [See, e.g., Goto, T. et al., Degradation of Polylactic acid Using Sub-Critical Water for Compost, Polymers, https://www.mdpi.com/2073-4360/12/11/2434/htm (2020).] Therefore, PLA is not suitable for the needs addressed here.

On the other hand, PHA is not only compostable but also marine biodegradable (unlike PLA), which means it potentially has less of an environmental impact even when improperly disposed outside of an industrial compositing facility. [See, e.g., Meereboer, K. W. et al., *Review of recent advances in the biodegradability of polyhydroxyalkanoate (PHA) bioplastics and their composites*, Green Chemistry (2020).] Furthermore, PHA-producing microbes are naturally found in the marine environment and therefore PHA is produced by microorganisms (as opposed to PLA and other plastics being produced via chemical synthesis. [See, e.g., Suzuki, M. et al., *Biodegradability of poly(3-hydroxyalkanoate) and poly(ϵ-caprolactone) via biological carbon cycles in marine environments*, Polymer Journal, 53: 47-66 (2021).] Compared to PLA, PHA can also accelerate degradation of a rigid vessel, making it the preferred choice for packaging applications. [See, e.g., Rydz, J. et al., *3D-Printed Polyester-Based Prototypes for Cosmetic Applications—Future Directions at the Forensic Engineering of Advanced Polymeric Materials*, https://www.ncbi.nlm.nih.gov/pmc/articles/PMC6470545/ Materials (2019).]

Although the byproducts of PHA enzymatic degradation (what is left over after breaking down or composting PHA) are already non-toxic to the environment and are naturally degraded and mineralized in the ocean [See, e.g., Suzuki as above], it is desired to even further improve on the end-of-lifecycle disposal of PHA to speed up biodegradation and mitigate concerns that acidic degradation byproducts (including hydroxybutyric acids and hydroxyvaleric acids) can potentially acidify the pH of soil and other natural environments upon disposal. [See, e.g., Muhammadi et al., *Bacterial polyhydroxyalkanoates-eco-friendly next generation plastic: Production, biocompatibility, biodegradation, physical properties and applications,* 1751-7192 (Online) Journal homepage: https://www.tandfonline.com/loi/tgc120.]

The invention described herein satisfies a long-felt need for providing eco-friendly biodegradable and compostable rigid packaging by providing a composite material formed of sustainable feedstock including PHA and organics. Prepared by the clean synthesis processes described herein, e.g., free or petrochemical and fossil fuel sources, this biodegradable bioplastic composition provides also for an environmentally-friendly end of life disposal solution that is further enhanced through the addition of organics to accelerate the decomposition process and to reduce acid content upon degradation. Thus, the biodegradable bioplastic compositions and processes described herein provide alternatives to heretofore available plastics and derivatives while maintaining the desirable mechanical properties (e.g., flexibility, durability, lightweight, compatible with water, compatible with extant packaging manufacturing equipment), but imparts the added benefit of sustainability.

SUMMARY OF THE INVENTION

In some cases, the present disclosure relates to a biodegradable bioplastic composition comprising from 80 wt % to 95 wt % of a polymer comprising one or more thermoplastic polyester polyhydroxyalkanoates (PHA) and from 5 wt % to 20 wt % an organic dispersed within the polymer. The biodegradable bioplastic composition is devoid of petrochemically derived components, fossil fuel derived components, processing aids, and plasticizer additives.

The biodegradable bioplastic composition may be 100% biobased and 100% biodegradable. Upon decomposition, the biodegradable bioplastic composition may demonstrate a reduction of concentration of acidic byproducts after enzymatic degradation as compared with a 100% polyhydroxyalkanoates (PHA) reference sample. Upon decomposition, the biodegradable bioplastic composition may demonstrate a reduction of concentration of acidic byproducts after enzymatic degradation as compared with a 100% pure poly(lactic acid) (PLA) reference sample.

The organic may comprise one or more of bamboo powder, bamboo fiber, hemp fiber, castor plant fiber, wool, charcoal powder, nut shell powder, pulp, or combinations thereof.

The biodegradable bioplastic composition may have an average tensile strength greater than 15 MPa as determined by ISO 179-1. The biodegradable bioplastic may be non-reactive with one or more solvents selected from water, dimethicone, glycerin, ethyl alcohol, or combinations thereof.

The biodegradable bioplastic composition may consist of: from 80 wt % to 95 wt % PHA; and from 5 wt % to 20 wt % one or more of bamboo powder, bamboo fiber, or combinations thereof.

In some cases, the present disclosure relates to an article comprising the biodegradable bioplastic composition. The article may be rigid at room temperature and have a wall thickness greater than 0.1 mm. The article may include a plurality of pellets suitable for forming processes. The article may be a packaging container.

The article may have a shelf life of greater than 12 months, or greater than 36 months. The article may be non-toxic to the environment when disposed at end of life cycle, and wherein the article demonstrates a decomposition rate greater than that of a 100% polyhydroxyalkanoates (PHA) reference sample. Other applications are also disclosed herein.

In some cases, the present disclosure relates to a process for preparing a biodegradable bioplastic composition. The process comprises compounding one or more thermoplastic polyester polyhydroxyalkanoates (PHA) and an organic to form a mixture and homogenizing the mixture. Homogenizing comprises feeding the mixture to a first extruder and extruding the mixture to form a composite composition and feeding the composite composition to a second extruder and extruding the composite composition to form the biodegradable bioplastic composition. The process may include granulating the biodegradable bioplastic composition.

Compounding in the process may comprise: from 80 wt % to 95 wt % of the one or more thermoplastic polyester polyhydroxyalkanoates (PHA), and from 5 wt % to 20 wt % the organic. Extruding in the first extruder and the second extruder may be at a temperature of 120 to 160° C.

The process may further include forming the biodegradable bioplastic composition to form a biodegradable bioplastic article, wherein the forming is chosen from one of injection-molding, die casting, and 3D printing. Forming via injection molding may be at back pressure ranging from 2.7 MPa to 3.3 MPa. The process may include where the biodegradable bioplastic composition is devoid of petrochemically derived components, fossil fuel derived components, processing aids, and plasticizer additives.

DETAILED DESCRIPTION OF THE DISCLOSED EMBODIMENTS

Introduction

Figure 1:
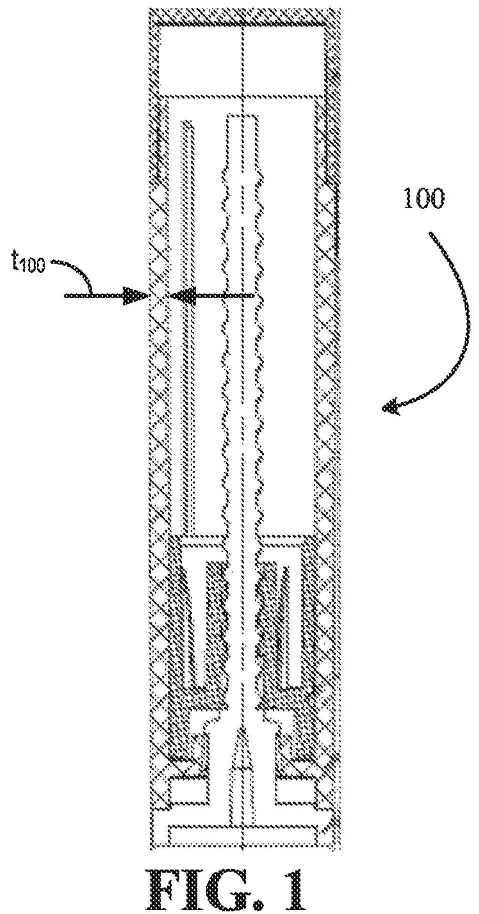
FIG. 1 illustrates a cross-sectional view of a container, such as a twist tube including a cap, according an exemplary embodiment.

As noted above, some conventional materials for rigid container packaging suffer from a multitude of problems including being non-sustainable in manufacturing and having deleterious environmental impact upon disposal. For example, many "recyclable" or "reclaimed" plastics rely on virgin material and/or rely on fossil fuel sources for their manufacture and/or are not biodegradable and compostable.

Moreover, even bioplastics made from PLA, while compostable and plant-derived, are non-marine biodegradable and are prone to generating acidic byproducts that decrease the pH of soil or compost. Additionally, PLA bioplastics are unsuitable for rigid packaging as noted above due to its relatively low glass transition temperature severely limiting applications for use.

The inventors have now found that a synergistic combination of organics and PHA provides the desired clean synthesis of composite material suitable for rigid packaging, e.g., 100% biobased and 100% biodegradable. For example, the disclosed composite materials demonstrate an unexpected balance of, inter alia, sustainability and being non-detrimental to the environmental while also enhancing decomposition and reducing the amount of acid after degradation.

The present invention addresses unmet commercial, consumer, and environmental needs by providing composite materials that exhibit an unexpectedly unique combination of mechanical and physical properties for rigid packaging, shelf-life, non-reactivity, biodegradability, and compostability that are not otherwise achievable. These biodegradable bioplastic compositions, in some cases, are directed to applications such as rigid packaging containers formed by injection-molding, die casting, and/or 3D printing. Key target areas include industrial or food applications that require rigid packaging to contain liquids and or solids that can be loaded at a range of temperatures. Examples of uses of biodegradable bioplastic composition include, but are not limited to, packaging for food and beverage science, healthcare, hospitality, pharmaceuticals, personal care, and health and beauty, home storage among many other sectors that utilize rigid multi-use packaging.

Without being bound by theory, when the disclosed biodegradable bioplastic PHA is employed with a high loading of organics, the components synergistically interact such that decomposition is accelerated and/or the amount of acid contribution from the PHA polymer component imparted upon degradation is reduced.

As used herein and in the appended claims, the use of "a," "an," and/or "the" is intended to include both the singular and plural (e.g., "one or more") unless the context clearly dictates otherwise. Thus, for example, reference to a "cell" is a reference to one or more cells and equivalents thereof known to those skilled in the art, and so forth.

Unless specified, "%" may refer to a percent by weight percent, or a percent by volume, or a percent weight by unit volume, and the relevant units would be immediately apparent to one of ordinary skill in the art based on the context.

As used herein, "greater than" and "less than" limits may also include the number associated therewith. Stated another way, "greater than" and "less than" may be interpreted as "greater than or equal to" and "less than or equal to." It is contemplated that this language may be subsequently modified in the claims to include "or equal to." For example, "greater than 4.0" may be interpreted as, and subsequently modified in the claims as "greater than or equal to 4.0."

"Consumer safe" means suitable for use as packaging for a variety of liquid, solid, and powder materials without danger of leeching any potentially toxic or irritating additives present in other materials such as plasticizers (phthalates) and hardeners (bisphenol A, e.g., BPA).

Among the many embodiments, the present invention includes biobased PHAs. Biobased or "natural" feedstocks must be used in the production of biobased PHA compositions. An example of a biobased PHA composition is one that is prepared from a bioderived feedstock (e.g., from current and sustainable agricultural activities, such as fermentation-, algae-, plant- or vegetable-derived; e.g., is derived from a vegetable source, preferably using a non-genetically modified organism, or biomass, and it is not petrochemically-derived (such as being derived from sustainable tree and plant farms active in the 21st century vs. fossil sources such as petroleum, natural gas, or coal). Such feedstocks are referred to herein as "natural" and "renewable" (i.e., "sustainable") and are known in the art as a non-petroleum-derived feedstock. Further, such materials are formed by "new" carbon and not from petroleum or other fossil fuel sources ("old" carbon). Such products are referred to herein as "natural" products and are known in the art as non-petrochemically-derived or "bio" products. As used herein, the term "sustainable" refers to starting materials, reaction products, compositions, and/or formulations that are derived from renewable sources. The term "sustainable" therefore is in contrast to "non-sustainable" starting materials, reaction products, compositions, and/or formulations that contain carbon from a limited natural resource, such as fossil fuel (e.g., petroleum or coal), natural gas, and the like. Thus, a natural or bio product is not petrochemically derived and/or is made from resources that are not petrochemically derived, but rather are sustainable and renewable. True natural products (bio-compounds) are formed using biomass (e.g., material stored from carbon cycle processes in living plants, roots, and the like, or released through animal respiration or refuse, or through decomposition). When carbon decomposes and is broken down over millions of years under pressure, it creates fossil fuels (the source of petrochemically-derived carbon). Bio-compounds herein are intended to include materials derived from the carbon of plant sources/biomass that exist(ed) recently and/or are sustainable, and explicitly excludes materials derived from fossil fuels.

A composition of the present invention can be identified, and distinguished from prior art compositions, by its biobased carbon content. In some embodiments, the biobased carbon content can be measured by radiocarbon dating to determine the relative age of materials comprised of organic (i.e., carbon-containing) matter. Radiocarbon is an unstable isotope of carbon, known as carbon-14 (i.e., "14C"). 14C is an unstable isotope that emits radiation energy in the form of beta particles at a very consistent rate (i.e. a half-life for radiocarbon is 5730 years) and ultimately decays to the more stable nitrogen-14 (14N). Because, petroleum-based (i.e. petrochemically-derived) feedstocks are derived from plants and animals buried millions of years ago, such feedstocks' radiocarbon (i.e., 14C) has been lost to radioactive decay. The ASTM International standards provide testing standards to determine the authenticity of a "bio-based compound" using radiocarbon, which may be found in ASTM D6866-16. This standard distinguishes newer carbon from carbon derived from fossil-fuel, or petroleum- and petrochemically-derived sources, i.e., "old carbon". The amount of 14C in recent or current biomass is known, so a percentage of carbon from a renewable source can be estimated from a total organic carbon analysis, which provides the data necessary to determine if a compound is truly derived from a "natural" and/or "sustainable" ("renewable") feedstock source or is derived conversely from a compound of "old" sequestration (i.e., a petrochemically-derived or petroleum-based source). The use of petroleum-based (also termed "fossil-based") feedstocks is generally accepted as being non-sustainable, i.e., old carbon is a non-sustainable and not a renewable feedstock and furthermore is not considered "natural" and/or "sustainable" in the art.

In some embodiments, the compositions of the present invention comprise biobased carbon as substantially all of the carbon present in the mixtures of compounds, which can refer to a biobased carbon content of at least 90%, at least 95%, or at least 98%. In some embodiments, the inventive compositions include entirely biobased PHAs and entirely biobased reactants determined to have a biobased carbon content of at least about 98%, at least about 99%, at least about 99.5%, or about 100%. The compositions of the present invention comprise organics, which are also biobased as detailed above.

The disclosed biodegradable bioplastic compositions as formulated are devoid of petroleum or fossil fuel components. In some cases, the disclosed biodegradable bioplastic compositions are 100% biobased, 100% biodegradable, and 100% marine biodegradable.

In one aspect, an article is disclosed. The article is made of/from or comprises a particular polymer composition. The composition includes from 80 wt % to 95 wt % PHA and from 5 wt % to 20 wt % organics dispersed within the polymer. Additional details of the PHA and organic components are disclosed herein. As noted above, the article demonstrates a synergistic balance of performance features for rigid containment as well as good mechanical and physical properties, e.g., properties that are comparable to other materials available on the market, and that the article is flexible and durable enough to endure 1-5 years shelf life including multiple uses (opening and closing repeatedly) across a range of temperatures.

The disclosed biodegradable bioplastic compositions are particularly germane to disposable multi-use packaging. As noted above, biodegradable bioplastic compositions for packaging require specific chemistry and characteristics that are not required or even desired for other applications.

The components of the biodegradable bioplastic composition are now discussed individually. It is contemplated that these components may be employed with one another to form the aforementioned biodegradable bioplastic compositions.

Polymers

The inventors have found that the disclosed biodegradable bioplastics demonstrate unexpected sustainability benefits over conventional polymers such as polypropylene (PP), polybutylene terephthalate (PBT), nylon 6 (PA6), nylon 66 (PA66), PBS, PBSA, PCL, PBAT, AAC, and even PLA polymers for disposable packaging applications and are comparable in efficacy to these conventional polymers due to at least their mechanical performance, physical properties, and for their food/cosmetic safe compatibility and environmental compatibility. Biodegradable bioplastic compositions can be formulated to have accelerated decomposition rates while maintaining critical properties such as shelf life.

Polymers of the present disclosure include one or more bioplastic polyhydroxyalkanoates (PHA). PHAs are biobased and biodegradable. PHAs are produced by bacterial fermentation using bio-derived feedstocks—including agricultural waste—and thus are an alternative to fossil fuel-derived plastics. PHAs are polyesters synthesized and stored by various bacteria and archaea in their cytoplasm as water-insoluble inclusions.

PHA is a family of polymers composed primarily of R-3-hydroxyalkanoic acids; the structure of PHA is shown in formula (I):

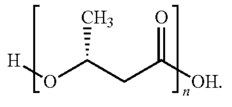

PHA polymers have properties of biodegradable thermoplastics and elastomers, which can be categorized into subclasses according to the side chain of their monomers. Specifically, there are three main categories: short-chain-length PHAs (scl-PHA with three to five carbon monomers), medium-chain-length PHAs (mcl-PHA with six to fourteen carbon monomers), and long-chain-length PHA (fifteen carbon monomers and greater). The biodegradable bioplastic composition disclosed herein includes one or more polyhydroxyalkanoates having chain lengths ranging from 3 to 5 carbons, 6 to 14 carbons, 15 carbons and greater, or combinations thereof.

Advantageously, PHAs (polyhydroxyalkanoates) based bioplastics are waterproof, durable in sterile and dry environments providing shelf-life and degrade in the soil. PHAs have thermoplastic properties and can be processed using common processes such as injection molding and thermoforming.

The biodegradable bioplastic composition comprises PHA(s) as the major component. In one embodiment, the biodegradable bioplastic composition comprises one or more PHAs in an amount ranging from 70 wt % to 99 wt %, e.g., from 75 wt % to 98 wt %, from 80 wt % to 95 wt %, or from 85 wt % to 95 wt %, or from 88 wt % to 92 wt %.

In terms of lower limits, the biodegradable bioplastic composition may comprise greater than 70 wt % PHAs, e.g., greater than 75 wt %, greater than 80 wt %, greater than 85 wt %, or greater than 88 wt %. In terms of upper limits, the biodegradable bioplastic composition may comprise less than 99 wt % PHAs, e.g., less than 98 wt %, less than 95 wt %, or less than 92 wt %. In some embodiments, the biodegradable bioplastic composition comprises 90 wt % PHAs.

The biodegradable bioplastic composition may comprise less than 1 wt % of non-PHA polymers, e.g., PP, PA6, PA66, PBT, PBS, PBSA, PCL, PBAT, AAC, PLA, or combinations thereof. In terms of upper limits, the biodegradable bioplastic composition may comprise less than 1 wt % of non-polyamide polymers, e.g., less than 0.5 wt %, less than 0.1 wt %, less than 0.005 wt %, or less than 0.001 wt %. In other words, the biodegradable bioplastic composition is devoid of or substantially devoid of non-PHA polymers.

In one embodiment, suitable PHA raw material include FDA food-contact approved injection moldable-grade pelletized PHAs, such as are available commercially as Mirel F1006 Injection Molding Grade PHA.

Organics

The biodegradable bioplastic composition further comprises an organic. The organic may comprise one or more of bamboo powder, bamboo fiber, hemp fiber, castor plant fiber, wool, charcoal powder, nut shell powder, pulp, or combinations thereof.

The biodegradable bioplastic composition comprises the organic as the minor component. In one embodiment, the biodegradable bioplastic composition comprises one or more organics in an amount ranging from 1 wt % to 30 wt %, e.g., from 2 wt % to 25 wt %, from 5 wt % to 20 wt %, or from 5 wt % to 15 wt %, or from 8 wt % to 12 wt %.

In terms of lower limits, the biodegradable bioplastic composition may comprise greater than 1 wt % organics, e.g., greater than 2 wt %, greater than 5 wt %, greater than 8 wt %, or greater than 10 wt %. In terms of upper limits, the biodegradable bioplastic composition may comprise less than 30 wt % organics, e.g., less than 25 wt %, less than 20 wt %, or less than 15 wt %. In some embodiments, the biodegradable bioplastic composition comprises 10 wt % organics.

Suitable organics include any anhydrous, naturally-derived organic powders and fibers. The organics are preferably homogenous and naturally water resistant. While the organics may comprise one or more of bamboo powder, bamboo fiber, hemp fiber, castor plant fiber, wool, charcoal powder, nut shell powder, pulp, or combinations thereof, this listing should not be construed as limiting.

For example, bamboo powder and fiber is suitable for the biodegradable bioplastic composition since bamboo is naturally water resistant, biodegradable, it does not impart an inherently dark color to the end product, and bamboo can be farmed and harvested sustainably.

Notably bamboo powder, for example, is a nonpolar material (as are organics typically), thus presents challenges to blend uniformly with the PHAs for which there is no mutual chemical attraction. The processes herein provide for uniform mixing of the composition including major (PHAs) and minor (organics) components herein without additives, as will be discussed in more detail below.

The organics, as blended with the polymer, may be in fiber or powder form. The organics are sized as being able to pass through a sieve and corresponding to a range of mesh size 200 to mesh size 2000. In certain embodiments, the mesh size is 2000.

In one embodiment, the organic is bamboo powder, as is farmed and harvested sustainably and non-GMO, and may be locally sourced. In one example, the chemical analysis of the bamboo powder includes 5.46% water, 12.08% calcium carbonate, 75.47% cellulose, 31.34% acid insoluble lignin, and 7.66% phenyl alcohol extract. This analysis is one example and, as known in the art, individual components of the bamboo can vary. The bamboo powder may be dried to remove water content and passed through a 2000 mesh size sieve prior to dispersing within the polymer.

Additional Components

The biodegradable bioplastic composition may comprise PHAs and organics as described above and nothing else, e.g., the composition is "additive free". No additives, such as those typically used in conventional plasticizing processes, are included in the biodegradable bioplastic composition and processes disclosed herein. This enables with 100% certainty that the synthesis of the biodegradable bioplastic composition is clean as is the processes described herein.

In some embodiments, the biodegradable bioplastic compositions (and the articles produced therefrom) advantageously comprise little or no content of processing aids or additives, such as surfactants, coupling agents, lubricants, impact modifiers, plasticizers, fillers, release agents, sizing agents, or glass. These may include processing aids or additives such as phthalates, bisphenol A (BPA), polyethylene glycols (PEGs), fatty acid amides, antioxidants, among others, or combinations thereof. Additionally, the biodegradable bioplastic compositions (and the articles produced therefrom) are devoid of sizing agents such as AKD & ASA, biobased polymer coatings, and wet-end additives such as cationic starch. The absence of these processing aids or additives requires homogenization during processing and manufacturing that is unique to the disclosure herein. And the exclusion of processing aids or additives differentiates biodegradable bioplastic compositions herein described as cleaner than other packaging materials on the market and therefore mitigates risk of leeching into or incompatibility with the contents of the container.

(Some of) these components mentioned herein, in some cases, may be considered optional. In some cases, the disclosed compositions may expressly exclude one or more of the aforementioned components in this section, e.g., via claim language. For example claim language may be modified to recite that the disclosed compositions, processes, etc., do not utilize or comprise one or more of the aforementioned components, e.g., the biodegradable bioplastic compositions do not include a plasticizer or an impact modifier.

In some cases, the biodegradable bioplastic compositions comprise less than 100 wppm processing aids or additives, e.g., less than 50 wppm, less than less than 20 wppm, less than 10 wppm, or less than 5 wppm. In terms of ranges, the polyamide compositions may comprise from 1 wppb to 100 wppm, e.g., from 1 wppb to 20 wppm, from 1 wppb to 10 wppm, or from 1 wppb to 5 wppm. The disclosed compositions may not employ any processing aids or additives at all. And there can be no processing aids or additives present after processing, which may not be the case for conventional bioplastics that do employ plasticizers and/or coupling agents as necessary components.

In some particular instances, the biodegradable bioplastic compositions or articles made therefrom can comprise (other than processing adds and/or additives as described above) optional aesthetic aids to add aesthetic appeal to the compositions or articles made therefrom as desired for the end consumer, e.g., non-ecotoxic inks and/or colorants or processing of organic raw material to lighten its color prior to mixing the biodegradable bioplastic composition. These optional components do not affect the structure or performance of the biodegradable bioplastic composition. Additionally or alternatively, the compositions or articles made therefrom may include etching or printing on one or more surfaces of the container. Optional aesthetic aids such as these are for decoration only.

Biodegradable Bioplastic Composition

The biodegradable bioplastic composition disclosed herein includes two ingredient components as disclosed above: PHA(s) as the major component and organics as the minor component. As discussed, advantageously other components are excluded.

In some embodiments, the biodegradable bioplastic composition comprises one or more PHAs in an amount ranging from 70 wt % to 99 wt %, e.g., from 75 wt % to 98 wt %, from 80 wt % to 95 wt %, or from 85 wt % to 95 wt %, or from 88 wt % to 92 wt %; and one or more organics in an amount ranging from 1 wt % to 30 wt %, e.g., from 2 wt % to 25 wt %, from 5 wt % to 20 wt %, or from 5 wt % to 15 wt %, or from 8 wt % to 12 wt %.

In certain embodiments, the biodegradable bioplastic composition consists of one or more PHAs in an amount ranging from 70 wt % to 99 wt %, e.g., from 75 wt % to 98 wt %, from 80 wt % to 95 wt %, or from 85 wt % to 95 wt %, or from 88 wt % to 92 wt %; and one or more organics in an amount ranging from 1 wt % to 30 wt %, e.g., from 2 wt % to 25 wt %, from 5 wt % to 20 wt %, or from 5 wt % to 15 wt %, or from 8 wt % to 12 wt %.

For example, the biodegradable bioplastic composition may comprise one or more PHAs in an amount ranging from 80 wt % to 95 wt % and one or more organics in an amount ranging from 5 wt % to 20 wt %. In exemplary embodiments, the biodegradable bioplastic composition consists of one or more PHAs in an amount ranging from 80 wt % to 95 wt % and one or more organics in an amount ranging from 5 wt % to 20 wt %.

Acid Content

The addition of organics is important because the inventors have found that the content of acid generated upon degradation of the biodegradable bioplastic composition may have a surprising effect on the performance of the biodegradable bioplastic compositions and articles. As one example, the acid content generated upon degradation has been found to decrease the pH of soil or compost. Thus, the biodegradable bioplastic compositions herein generate an acid content that is reduced through the introduction of organics in the composition. Upon decomposition, in certain embodiments, the biodegradable bioplastic composition demonstrates a reduction of concentration of acidic byproducts after enzymatic degradation as compared with the 100% polyhydroxyalkanoates (PHA) reference sample. Upon decomposition, in certain embodiments, the biodegradable bioplastic composition demonstrates a reduction of concentration of acidic byproducts after enzymatic degradation as compared with a 100% pure poly(lactic acid) (PLA) reference sample.

The biodegradable bioplastic composition reduces the acid content generated upon degradation by a percentage as compared with a pure (100%) PHA reference sample. In one embodiment, the biodegradable bioplastic composition reduces the acid content generated upon degradation [by a percentage as compared with a pure (100%) PHA reference sample] in an amount ranging from 1% to 30%, e.g., from 2% to 25%, from 5% to 20%, or from 5% to 15%, or from 8% to 12%.

In terms of lower limits, the biodegradable bioplastic composition may reduce the acid content generated upon degradation [by a percentage as compared with a pure (100%) PHA reference sample] in an amount greater than 1%, e.g., greater than 2%, greater than 5%, greater than 8%, or greater than 10%. In terms of upper limits, the biodegradable bioplastic composition may reduce the acid content generated upon degradation [by a percentage as compared with a pure (100%) PHA reference sample] in an amount less than 30%, e.g., less than 25%, less than 20%, or less than 15%. In some embodiments, the biodegradable bioplastic composition reduces the acid content generated upon degradation [by a percentage as compared with a pure (100%) PHA reference sample] in an amount 10%.

This reduction of the acid content generated upon degradation may be directly correlated to the organic content, in other words, the reduction of acid content generated upon degradation is proportional to the organic content. This reduction is important as minimizes any effects to the environmental soils or compost upon degradation. Thus, high organic loading is desired as the higher the organic content, the higher the reduction of acid content is realized.

Rate of Degradation

The addition of organics is also important because the inventors have found that the organic content of the biodegradable bioplastic composition is surprisingly effective at accelerating decomposition. Thus, by adding as much organic matter as possible while maintaining structural integrity (e.g., mechanical properties), the biodegradable bioplastic composition disclosed herein accelerates decomposition. The decomposition is accelerated as compared to pure PLA or PHA products. Upon decomposition, in certain embodiments, the biodegradable bioplastic composition demonstrates accelerated decomposition as compared with the 100% polyhydroxyalkanoates (PHA) reference sample. Upon decomposition, in certain embodiments, the biodegradable bioplastic composition demonstrates accelerated decomposition as compared with a 100% pure poly(lactic acid) (PLA) reference sample. The biodegradable bioplastic compositions disclosed herein break down at a rate of degradation that is equal to or higher than the rate of degradation of pure PHA, e.g., a 100% polyhydroxyalkanoates (PHA) reference sample.

Properties

As noted herein, by utilizing a biodegradable bioplastic composition having the aforementioned PHAs and organics in the disclosed amounts, the resultant composition and/or article formed from the composition is capable of providing containment of contents for a determined shelf life and subsequently decomposes upon disposal.

Tensile Strength

The biodegradable bioplastic composition, and/or articles formed therefrom, has a tensile strength greater than 15 MPa as determined by ISO 179-1. As understood, while 15 MPa is a preferred lower limit, the biodegradable bioplastic compositions and articles can have lower tensile strength as is suitable for some applications. The biodegradable bioplastic compositions and articles formed therefrom more commonly have a tensile strength greater than 15 MPa. The tensile strength of the biodegradable bioplastic compositions disclosed herein are comparable to that of pure (100%) PHA. The ratio of organic material, and processing methods as described herein, are carefully tailored so as not to compromise the structural fidelity.

In some cases, the biodegradable bioplastic compositions and/or articles have an average tensile strength greater than 15 MPa, e.g., greater than 15.5 MPa, greater than 16 MPa, greater than 16.5 MPa, greater than 17 MPa, greater than 17.5 MPa, greater than 18 MPa, or greater than 18.5 MPa. In terms of ranges, the biodegradable bioplastic compositions may have an average tensile strength from 15 MPa to 20 MPa, e.g., from 16 MPa to 20 MPa, from 17 MPa to 20 MPa, or from 15 MPa to 20 MPa. For biodegradable bioplastic compositions and/or articles, an average tensile strength of greater than 20 MPa for the compositions and/or articles is also contemplated.

Density

The biodegradable bioplastic composition has a density of about 1.29 g/cm$^3$. The biodegradable bioplastic compositions and articles formed therefrom can have a density greater than 1.29 g/cm$^3$ or a density less than 1.29 g/cm$^3$. At this density value, the density is about half that of glass having a density of about 2.5 g/cm$^3$. In some instances, a lower density is desirable as the articles for end use are then even lighter. In some cases, the biodegradable bioplastic compositions and/or articles may have a density from 1.29 g/cm$^3$ to 1.35 g/cm$^3$. For biodegradable bioplastic compositions and/or articles, a density less than 1.29 g/cm$^3$ is also contemplated.

The density of the biodegradable bioplastic compositions disclosed herein are comparable to that of to current rigid plastics on the market such as PP, PBT, PA6, PA66, as well as being comparable to that of pure (100%) PHA. Advantageously, the density of the biodegradable bioplastic composition is much lower than commonly used glass containment articles, thus the biodegradable bioplastic composition and articles formed therefrom are significantly lighter to transport and incur a reduced carbon footprint.

Non-Reactivity

The biodegradable bioplastic composition is non-reactive with solvents, where the solvents may be at various concentrations. Solvents include those found in consumer products such as, but are not limited to, water, dimethicone, glycerin, and ethyl alcohol at certain concentrations in water.

Compatibility

The biodegradable bioplastic composition is compatible with many anhydrous, aqueous, emulsified, and oil-based consumer packaged goods at standard shelf conditions throughout the lifecycle of the product.

Stability

The biodegradable bioplastic composition is rigid and shelf-stable for use with consumer packaged goods to the degree that it can withstand industry standard accelerated stability testing including freeze-thaw cycles, varying temperature and humidity conditions without leeching into the packaged contents or becoming brittle.

The stability of the biodegradable bioplastic composition makes the composition and articles formed therefrom suitable for multiple uses, such as non-limiting example of a reusable bottle that can be emptied and refilled. In particular embodiments, the biodegradable bioplastic compositions and articles is differentiated from single-use films and such that are utilized only once.

Shelf Life

The biodegradable bioplastic composition and articles made therefrom have a shelf life of greater than 12 months, greater than 18 months, greater than 24 months, greater than 30 months, greater than 36 months, greater than 42 months, or greater than 48 months.

Compostability

The biodegradable bioplastic composition, having all the raw materials (PHA and organics) that are biodegradable, is also “compostable” and believed “industrially compostable” according to ASTM D6400 standards. The biodegradable bioplastic composition and articles made therefrom are non-toxic to the environment when disposed at end of life cycle.

Thickness

Figure 2:
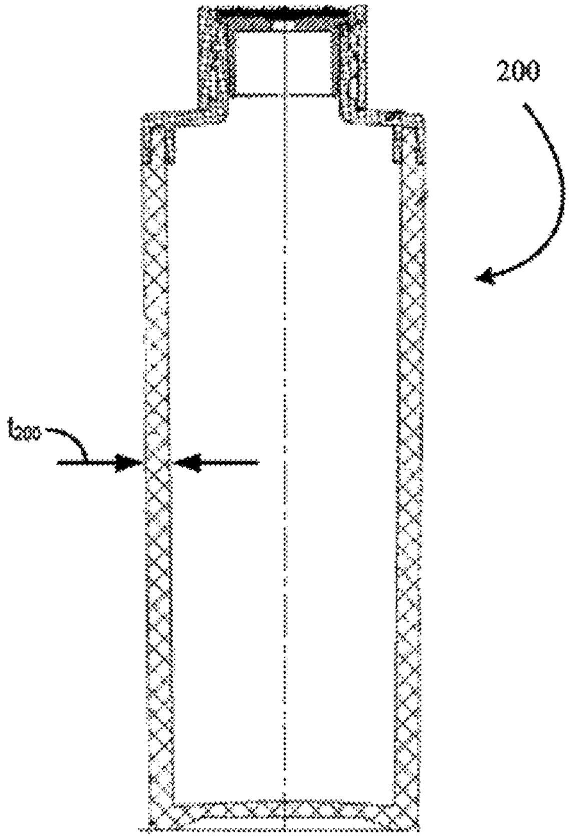
FIG. 2 illustrates a cross-sectional view of a container, such as a bottle including a cap, according an exemplary embodiment.
Figure 3:
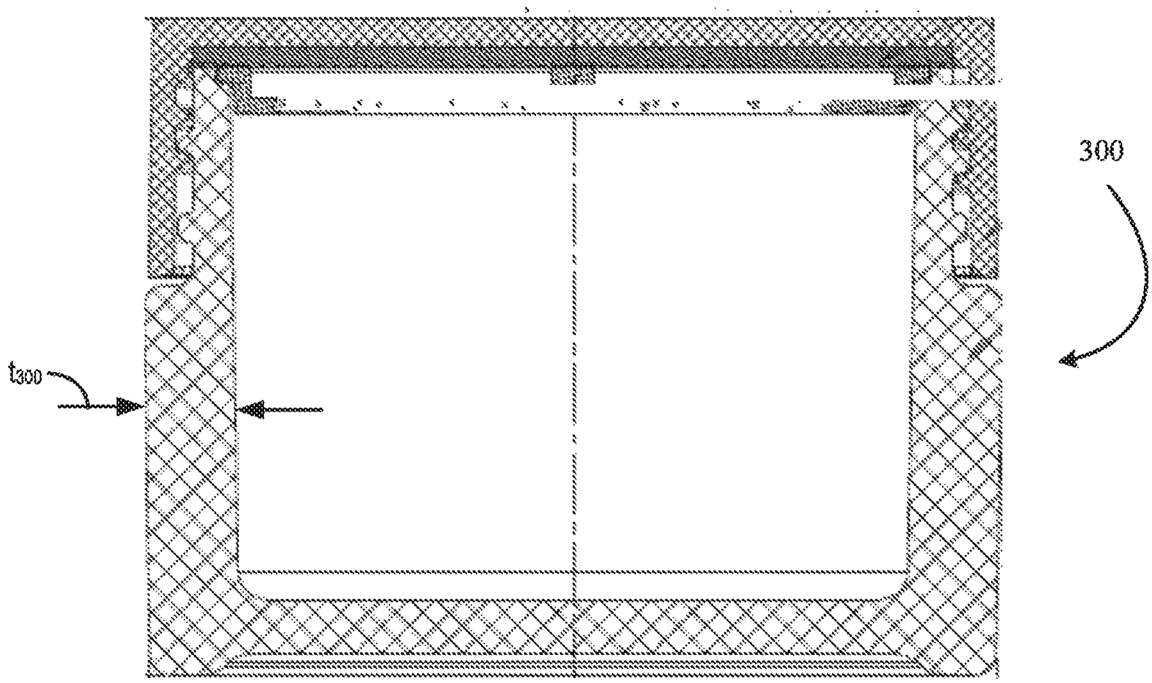
FIG. 3 illustrates a cross-sectional view of a container, such as a jar including a lid, according an exemplary embodiment.

The inventors found that the biodegradable bioplastic compositions are suitable for a wide range of wall thicknesses for articles formed from the composition. The article wall can mean any thickness through the container such as, e.g., a side wall, a circumferential wall, a top, or a bottom. FIGS. 1-3 illustrate cross-sectional views of exemplary articles 100, 200, and 300 showing wall thicknesses, t, e.g., $t_{100}$, $t_{200}$, and $t_{300}$, for exemplary biodegradable bioplastic articles for containment. As FIGS. 1-3 show, a variety of shapes and sizes are contemplated.

In non-limiting examples, FIG. 1 shows a tube 100, such as for a lip balm container, with a wall thickness, $t_{100}$, of about 1.3 mm, where the wall thickness ranges from 0.8 mm to 2.5 mm. In another non-limiting example, FIG. 2 shows a bottle 200 for containing 120 mL having wall thickness, $t_{200}$, of about 3.5 mm, where the wall thickness ranges from 1.5 mm to 4.4 mm. In yet another non-limiting example, FIG. 3 shows a jar 200 for containing 60 mL having a wall thickness, $t_{300}$, of about 4.2 mm and ranging from 1.5 mm to 6.2 mm. The jar includes a separate monolithic lid having a thickness of about 1.8 mm.

In some cases, the thickness, t, of the biodegradable bioplastic article wall can range from 0.01 mm to 100 mm, e.g., 0.1 mm to 50 mm, 0.1 mm to 25 mm, 0.1 mm to 10 mm, or from 1 to 5 mm.

In terms of lower limits, the thickness of the biodegradable bioplastic article wall may be greater than 0.01 mm, e.g., greater than 0.1 mm, greater than 0.2 mm, greater than 0.3 mm, or greater than 1 mm. In certain aspects, the wall thickness is greater than 0.1 mm, greater than 0.125 mm, greater than 0.15 mm, greater than 0.175 mm, greater than 0.25 mm, greater than 1 mm, greater than 1.5 mm, or greater than 2 mm.

In terms of upper limits, the thickness of the biodegradable bioplastic article wall may be less than 100 mm, e.g., less than 50 mm, less than 25 mm, less than 10 mm, or less than 5 mm.

Homogeneous Composition

The biodegradable bioplastic compositions disclosed herein are suitable for forming articles, such as those for use in packaging and/or as containers. The composition according to the process herein demonstrates homogeneity. That means that the dispersed organics are uniformly distributed in the biodegradable bioplastic material. After processing for the composition, the biodegradable bioplastic material may be in pellet form, which can be directly supplied to manufactures of articles (e.g., containers) for use in further forming processes.

Monolithic Articles

Advantageously, the articles made are monolithic. In other words, the formed articles (by the further forming methods described herein) can and are preferably formed into monolithic shapes of uniform material (the biodegradable bioplastic composition). In certain embodiments, the formed articles are devoid of other materials. Specifically, this means that the formed articles herein are free of additional materials and/or layers and/or coatings. The articles disclosed herein are of a single material (biodegradable bioplastic composition) formed into monolithic article(s) that provide another benefit at end of lifecycle — ease of disposal. This is because articles formed of more than one material, such as layered or laminated articles, may require separation prior to disposal. Thus, for example, laminated packaging is preferably excluded as contemplated herein, as are articles formed to have two layers or more (e.g., a formed plastic layer or material combined with another material or layer such as cork, paper, among others).

Processing

The present disclosure also relates to processes for preparing the provided biodegradable bioplastic compositions and/or articles formed therefrom. The biodegradable bioplastic articles disclosed herein may be formed by injection molding, die casting, and/or 3D printing to manufacture rigid plastic articles for end use.

Figure 4:
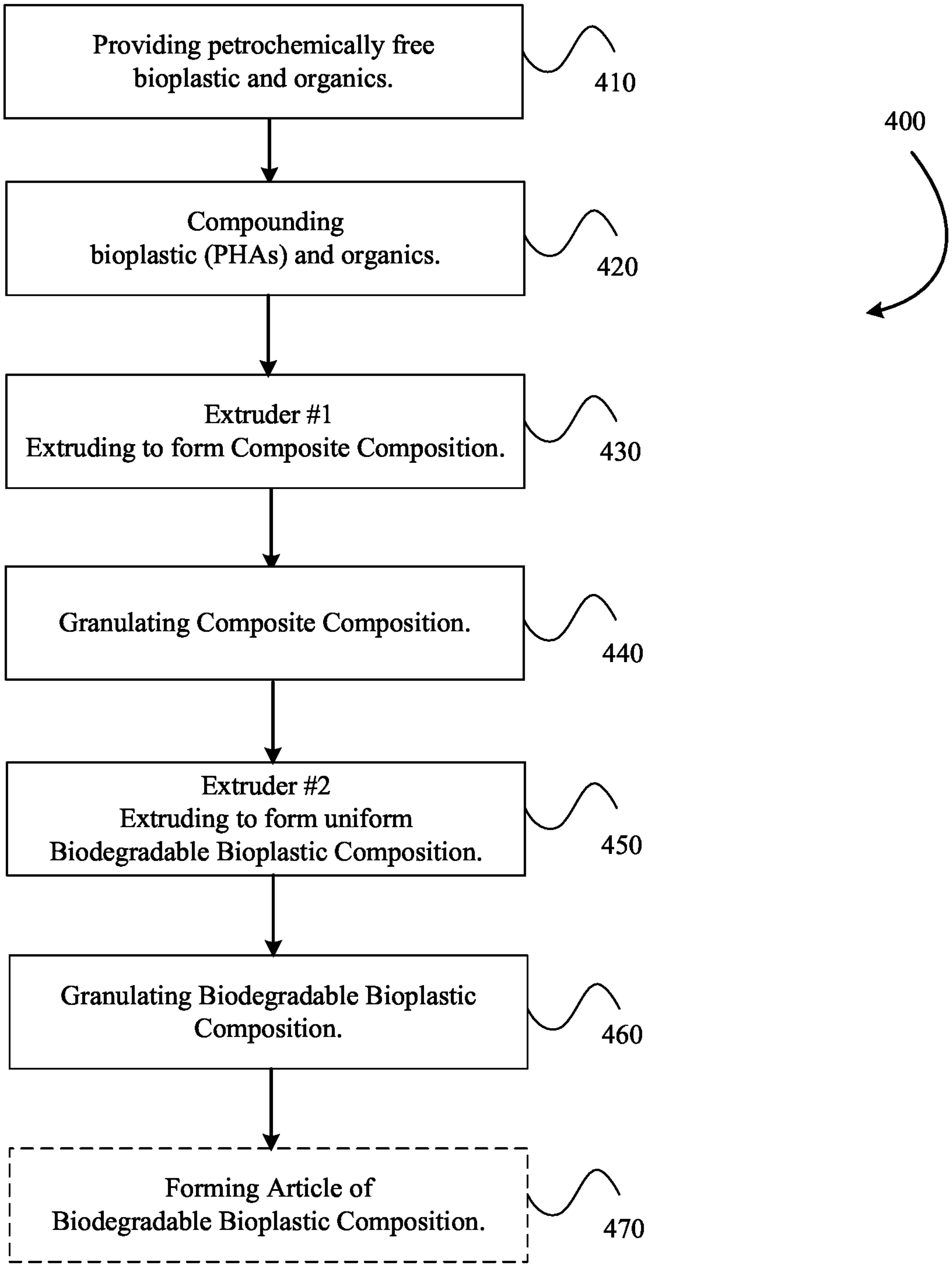
FIG. 4 is a flow chart of an exemplary process.

Compositions of biodegradable bioplastic as described herein and including organics were prepared according to the process as described below; FIG. 4 is a flow chart of an exemplary process 400. Advantageously, the processes are compatible with existing equipment as known in the art.

The raw materials are prepared by assembling and weighing. The bioplastic component is thermoplastic polyhydroxyalkanoates (PHA) polymers (in pellet form), manufactured sustainably through a fermentation process and without use of petroleum raw materials (zero petroleum or fossil fuel components).

The organics are chosen from one or more of bamboo powder, bamboo fiber, hemp fiber, castor plant fiber, wool, charcoal powder, nut shell powder, pulp, or combinations thereof. The organics are then sieved the through a sieve chosen from a size between 200 and 2000 mesh screen, preferably 2000 mesh screen. In certain embodiments, the raw materials comprise 80 wt % to 95 wt % bioplastics and 5 wt % to 20 wt % organic matter. The petrochemically free bioplastic and organics are provided 410 for compounding, also referred to interchangeable as pre-mixing. The petrochemically free bioplastics and organics used herein are bio-based made purely from plant-based raw materials.

Compounding 420 is performed in a high-speed mixer and includes mixing the bioplastic and organics until heated to a temperature of 100° C. to form a mixture. Notably, the mixture formed requires further homogenization that is achieved in the double extrusion described (steps 430 and 450). After compounding, the mixture is fed into a twin screw extruder (first extruder) to form a composite composition.

Extruding 430 is performed in the first extruder at a screw speed of from 40 RPM to 50 RPM and a first extruder hopper (feeding cylinder) temperature of from 120° C. to 160° C. Fan cooling is used to cool the first extruder at twelve evenly distributed intervals, each including a fan parallel to and along the axis of the first extruder. The mixture fed to the first extruder and extruded forms a composite composition.

Granulating 440 the composite composition includes the extruded material from the first extruder being automatically cut into pellets of standard size (3 mm diameter, 3 mm length). The pellets are fed into the second extruder.

As mentioned above, it is sought and critical to achieve a homogeneous composition. Natural organic powders, such as bamboo for example, are non-polar and do not readily mix with nor are chemically attracted to the PHA. Thus, the composite composition is extruded for a second time. By extruding in two separate steps, a homogenous biodegradable bioplastic composition is achieved. This is important because this overcomes the most challenging aspect of preparing the biodegradable bioplastic composition herein with natural organic powders, which is to mix the organics with the PHA to provide a homogenous biodegradable bioplastic composition. Further homogenization is achieved in the double extrusion as described and having temperatures that are much lower and screw speeds that are significantly higher than would be used with typical plastic processing, such as for polypropylene (PP). For example, cylinder temperatures for each extruding herein are from 120° C. to 160° C. as compared with the higher temperatures required for PP processing at from 200° C. to 275° C. And, back pressure used later in forming 470 are about 3.0 MPa (435 psi), whereas the lower back pressures required for PP processing are from 50 psi to 100 psi. By utilizing the higher back pressure during forming with the lower temperature during extrusion, synergistically along with providing two extruding steps separately, has been found to provide the requisite homogeneity.

Thus, in a subsequent separate step similar to extruding 430, extruding 450 is performed in a second extruder at a screw speed of from 40 RPM to 50 RPM and a second extruder hopper temperature of from 120° C. to 160° C. Fan cooling is again used to cool the second extruder at twelve evenly distributed intervals, each including a fan parallel to and along the axis of the second extruder. The mixture fed to the second extruder and extruded to form a biodegradable bioplastic composition that is homogeneous. Without being bound by theory, extruding for a second time (with cooling between extrudings) surprisingly provides homogeneity so that the resultant pellets produced are suitable for forming directly by processes known in the art, such as those for forming 470. As such, the second extruding step is a required step to achieve homogeneity.

Granulating 460 the biodegradable bioplastic composition includes the extruded material from the second extruder being automatically cut into pellets of standard size (3 mm diameter, 3 mm length). The pellets are then granulated.

Optionally, forming 470 is performed to provide an article from the biodegradable bioplastic composition, such as a packaging container, for end use. The pellets and/or granules are provided for forming by methods known in the art using standard equipment. From the process 400 as described herein, a rigid, shelf-stable, and compostable container manufactured by injection-molding, die casting, or 3D printing, other processes known in the art, or combinations thereof. Advantageously, the biodegradable bioplastic compositions and/or articles made therefrom are non-toxic to the environment when disposed at end of life cycle.

Forming 470 may include injection molding. The pellets and/or granules are loaded into the injection molding press with molds for rigid container of any variable shapes. Injection molding techniques are well known in the art and the compositions herein are compatible with existing processes and apparatus. The pellets and/or granules of the biodegradable bioplastic composition are fed into the injection molding press through an automatic hopper. Forming 470 utilizing injection molding includes allowing the press to proceed with injection molding at a temperature ranging from 165° C. to 185° C. with an injection nozzle temperature at 170° C., a molding back pressure ranging from 2.7 MPa to 3.3 MPa, e.g., at about 3.0 MPa (435 psi), and a mold chiller cooling temperature at 55° C. The molding back pressure is necessarily high as compared with PP injection molding techniques, which is typically molded with a back pressure of around from 50 psi to 100 psi. It is believed that the high molding back pressure as disclosed herein promotes the integrity of the material, in other words, the molded article sticks together well and a superior article is formed as a result.

Forming 470 may alternatively, or additionally, include 3D printing for forming a packaging container of the pellets and/or granules of the biodegradable bioplastic composition of process 400. The pellets and/or granules of the biodegradable bioplastic composition are further extruded into filaments. Alternatively, uncut extruded cables from the pellet manufacturing process 400 may be used. The extruded filament and/or extruded cables are loaded into the 3D printer intake and the 3D printing is performed at a temperature ranging from 160° C. to 180° C. The 3D printer and hot plate are then turned off, the article let to cool and is then released from the 3D printer.

The pellets and/or granules of the biodegradable bioplastic composition of process 400 are suitable for plastic processing and can be envisioned to form consumer products and rigid parts such in a variety of sizes and shapes, specific applications of which are described below.

Importantly, process 400 including steps 410-470, optionally and otherwise, for preparing biodegradable bioplastic compositions and/or articles made therefrom is completely (100%) free of processing aids and/or additives as described previously. Thus, the integrity of the biodegradable bioplastic compositions and/or articles made therefrom is preserved without involving non-biodegradable or eco-toxic additives. And no additives are introduced nor required to assist in mixing of the PHA plastic resin with the organics prior to the forming processes because homogenization is achieved by extruding in two discrete steps as described.

Applications

The biodegradable bioplastic composition of the processes herein can be provided in pellet form. Importantly, these pellets can be used with existing manufacturing plants and molds/tooling to replace any range of plastic parts that currently use petroleum-based thermoplastics. Thus, the industrial applicability is non-limiting.

The biodegradable bioplastic compositions and/or articles made therefrom may be formed into any of a variety of container shapes according to application for use. In some embodiments, the biodegradable bioplastic article is a food packaging container or a consumer health and beauty container. Articles made from the biodegradable bioplastic compositions may include, but are not limited to, hollow containers (packaging vessels and closures), solid parts (toys, automotive, electronics, medical devices, tools, home goods), and other plastic products in large volumes, and the like.

Advantages of the present biodegradable bioplastic compositions and/or articles made therefrom and processes for preparing make their industrial applicability clear. They are clean and environmentally-friendly with only two ingredient components (and no conventional additives). The biodegradable bioplastic compositions and/or articles use 100% plant-derived raw materials and are manufactured using a two-step extrusion process that is compatible with existing injection-molding machinery. When formed into a rigid container for use in consumer product packaging, these biodegradable bioplastic compositions and/or articles provide a safe stable barrier that can be composted at the end of its lifecycle and fill the need for an eco-friendly alternative to petroleum-based plastic or other heavier packaging materials such as glass thus reducing carbon footprint implications.

Exemplary Formulations

The biodegradable bioplastic compositions and/or articles and processes for preparing same as described herein will be further understood by the following exemplary formulations and embodiments.

The present disclosure relates to biodegradable bioplastic compositions that include any of the provided compositions. In one embodiment, the biodegradable bioplastic compositions comprises PHAs and organics. The organics comprises bamboo fiber or powder, or combinations thereof.

In some embodiments, the organics, e.g., bamboo fiber or powder, is added to the biodegradable bioplastic composition to accelerate the decomposition process and to reduce acid content upon degradation. These beneficial features allow for ready compostability as well as safety to the environment local to the disposal.

EXAMPLES

The samples were prepared according to the process 400 as described above. The PHA used was Mirel F1006 Injection Molding Grade. The non-GMO bamboo used was farmed and harvested sustainably and was locally sourced.

Mechanical and physical properties for biodegradable bioplastic compositions according to the present disclosure are shown in Tables 1 and 2. The test method for tensile strength is GB/T 1043.1-2008/ISO 179-1:2000, Plastic Tensile Properties (GB/T1040-2006) and having a sample resin width*thickness of 10 mm×4 mm. Three to nine samples were tested for each average value for tensile strength.

Table 1 shows tensile strength data for samples E1 to E16 including PHA and the bamboo content as shown. Comparatives C1 and C2 are for pure (100%) PHA and PP, respectively. The testing was performed using a Microcomputer Control Electronic Universal Testing Machine (WDW-10) with tensile tester load ranging from 0.1 KN-10 KN.

TABLE 1

Tensile Strength for Biodegradable Bioplastic Compositions

| | Organic Content and Size | | Tensile | |
|---|---|---|---|---|
| Sample | Bamboo Content (%) | Mesh Size | Strength Average (MPa) | Velocity (mm/min) |
| C1 (PHA) | 0 | N/A | 15.78 | 10 |
| E1 | 30 | 80 | 16.58 | 10 |
| E2 | 30 | 80 | 18.28 | 50 |
| E3 | 30 | N/A, fiber | 15.59 | 10 |
| E4 | 30 | N/A, fiber | 17.41 | 50 |
| E5 | 30 | 2000 | 14.18 | 10 |
| E6 | 20 | 80 | 16.64 | 10 |
| E7 | 20 | N/A, fiber | 15.85 | 10 |
| E8 | 20 | 200 | 17.08 | 10 |
| E9 | 20 | 200 | 18.59 | 50 |
| E10 | 20 | 2000 | 14.86 | 10 |
| E12 | 15 | 80 | 17.59 | 10 |
| E13 | 15 | N/A, fiber | 15.94 | 10 |
| E14 | 15 | 200 | 17.34 | 10 |
| E15 | 15 | 2000 | 15.60 | 10 |
| E16 | 10 | 2000 | 15.69 | 10 |
| C2 (PP) | 0 | N/A | 30.51 | 50 |

Table 2 shows density data for samples as shown including PHA and the bamboo content as shown. Comparatives C1 and C2 are for pure (100%) PHA and PP, respectively. Additional density values are included for C3 and C4, which are PBT and PA66, respectively. Three to nine samples were tested for each average value for density.

TABLE 2

Density for Biodegradable Bioplastic Compositions

| | Organic Content and Size | | |
|---|---|---|---|
| Sample | Bamboo Content (%) | Mesh Size | Average Density (g/cm$^3$) |
| C1 (PHA) | 0 | N/A | 1.304 |
| E1 | 30 | 80 | 1.340 |
| E2 | 30 | 80 | 1.338 |
| E3 | 30 | N/A, fiber | 1.328 |
| E5 | 30 | 2000 | 1.335 |
| E17 | 30 | 200 | 1.334 |
| E6 | 20 | 80 | 1.327 |
| E7 | 20 | N/A, fiber | 1.322 |
| E8 | 20 | 200 | 1.324 |
| E19 | 20 | 500 | 1.323 |
| E10 | 20 | 2000 | 1.325 |
| E12 | 15 | 80 | 1.322 |
| E13 | 15 | N/A, fiber | 1.320 |
| E14 | 15 | 200 | 1.318 |

TABLE 2-continued

Density for Biodegradable Bioplastic Compositions

| | Organic Content and Size | | |
|---|---|---|---|
| Sample | Bamboo Content (%) | Mesh Size | Average Density (g/cm$^3$) |
| E18 | 15 | 500 | 1.317 |
| E15 | 15 | 2000 | 1.319 |
| E16 | 10 | 2000 | 1.297 |
| C2 (PP) | 0 | N/A | 0.904 |
| C3 (PBT) | 0 | N/A | 1.295 |
| C4 (PA66) | 0 | N/A | 1.122 |

Embodiments

The following embodiments are contemplated. All combinations of features and embodiments are contemplated.

Embodiment 1: A biodegradable bioplastic composition comprising from 80 wt % to 95 wt % of a polymer comprising one or more thermoplastic polyester polyhydroxyalkanoates (PHA) and from 5 wt % to 20 wt % an organic dispersed within the polymer. The biodegradable bioplastic composition is devoid of petrochemically derived components, fossil fuel derived components, processing aids, and plasticizer additives.

Embodiment 2: An embodiment of embodiment 1, wherein the composition is 100% biobased and 100% biodegradable.

Embodiment 3: An embodiment of embodiment 1 or 2, wherein upon decomposition the composition demonstrates a reduction of concentration of acidic byproducts after enzymatic degradation as compared with a 100% polyhydroxyalkanoates (PHA) reference sample.

Embodiment 4: An embodiment of any of the embodiments of embodiment 1-3, wherein upon decomposition the composition demonstrates a reduction of concentration of acidic byproducts after enzymatic degradation as compared with a 100% pure poly(lactic acid) (PLA) reference sample.

Embodiment 5: An embodiment of any of the embodiments of embodiment 1-4, wherein the organic comprises one or more of bamboo powder, bamboo fiber, hemp fiber, castor plant fiber, wool, charcoal powder, nut shell powder, pulp, or combinations thereof.

Embodiment 6: An embodiment of any of the embodiments of embodiment 1-5, wherein the composition has an average tensile strength greater than 15 MPa as determined by ISO 179-1.

Embodiment 7: An embodiment of any of the embodiments of embodiment 1-6, wherein the composition is non-reactive with one or more solvents selected from water, dimethicone, glycerin, ethyl alcohol, or combinations thereof.

Embodiment 8: An embodiment of any of the embodiments of embodiment 1-7, wherein the composition consists of: from 80 wt % to 95 wt % PHA; and from 5 wt % to 20 wt % one or more of bamboo powder, bamboo fiber, or combinations thereof.

Embodiment 9 is an embodiment that is an article comprising the biodegradable bioplastic composition using any of embodiments 1-8, wherein the article is rigid at room temperature and has a wall thickness greater than 0.1 mm.

Embodiment 10 is an embodiment that is an article comprising the biodegradable bioplastic composition using any of embodiments 1-9, wherein the article includes a plurality of pellets suitable for forming processes.

Embodiment 11 is an embodiment that is an article comprising the biodegradable bioplastic composition using any of embodiments 1-10, wherein the article is a packaging container.

Embodiment 12 is an embodiment that is an article comprising the biodegradable bioplastic composition using any of embodiments 1-11, wherein the article has a shelf life of greater than 12 months.

Embodiment 13 is an embodiment that is an article comprising the biodegradable bioplastic composition using any of embodiments 1-12, wherein the article has a shelf life of greater than 36 months.

Embodiment 14 is an embodiment that is an article comprising the biodegradable bioplastic composition using any of embodiments 1-13, wherein the article is non-toxic to the environment when disposed at end of life cycle.

Embodiment 15 is an embodiment that is an article comprising the biodegradable bioplastic composition using any of embodiments 1-14, wherein the article demonstrates a decomposition rate greater than that of a 100% polyhydroxyalkanoates (PHA) reference sample.

Embodiment 16: A process of any of the embodiments of embodiment 1-15, wherein the process comprises compounding one or more thermoplastic polyester polyhydroxyalkanoates (PHA) and an organic to form a mixture; homogenizing the mixture comprising: feeding the mixture to a first extruder and extruding the mixture to form a composite composition; and feeding the composite composition to a second extruder and extruding the composite composition to form the biodegradable bioplastic composition. The process optionally includes granulating the biodegradable bioplastic composition.

Embodiment 17: An embodiment of any of the embodiments of embodiment 1-16, wherein the compounding comprises: from 80 wt % to 95 wt % of the one or more thermoplastic polyester polyhydroxyalkanoates (PHA), and from 5 wt % to 20 wt % the organic.

Embodiment 18: An embodiment of any of the embodiments of embodiment 1-17, wherein the extruding in the first extruder and the second extruder is at a temperature of 120 to 160° C.

Embodiment 19: An embodiment of any of the embodiments of embodiment 1-18, further including forming the biodegradable bioplastic composition via injection-molding, wherein the forming is at a back pressure ranging from 2.7 MPa to 3.3 MPa.

Embodiment 20: An embodiment of any of the embodiments of embodiment 1-19, including forming the biodegradable bioplastic composition to form a biodegradable bioplastic article, wherein the forming is chosen from one of injection-molding, die casting, and 3D printing.

Embodiment 21: An embodiment of any of the embodiments of embodiment 1-20, wherein the biodegradable bioplastic composition is devoid of petrochemically derived components, fossil fuel derived components, processing aids, and plasticizer additives.

While the disclosure has been described in detail, modifications within the spirit and scope of the disclosure will be readily apparent to those of skill in the art. In view of the foregoing discussion, relevant knowledge in the art and references discussed above in connection with the Background and Detailed Description, the disclosures of which are all incorporated herein by reference. In addition, it should be understood that aspects of the disclosure and portions of various embodiments and various features recited below and/or in the appended claims may be combined or interchanged either in whole or in part. In the foregoing descriptions of the various embodiments, those embodiments which refer to another embodiment may be appropriately combined with other embodiments as will be appreciated by one of skill in the art. Furthermore, those of ordinary skill in the art will appreciate that the foregoing description is by way of example only, and is not intended to limit the disclosure.

What is claimed is:

1. An article comprising a biodegradable bioplastic composition comprising:

greater than 80 wt % of a polymer comprising one or more thermoplastic polyester polyhydroxyalkanoates (PHA), and from at least 5 wt % to less than 20 wt % of an organic dispersed within the polymer, wherein the organic is a bamboo powder having a mesh size of 1000 to 2000;

wherein the biodegradable bioplastic composition is 100% biodegradable and industrially compostable according to ASTM D6400 and devoid of petrochemically derived components, fossil fuel derived components, processing aids, and plasticizer additives wherein the article is rigid at room temperature, is non-porous, and has a wall thickness greater than 0.1 mm.

2. The article of claim 1, wherein upon decomposition the composition demonstrates a reduction of concentration of acidic byproducts after enzymatic degradation as compared with a 100% polyhydroxyalkanoates (PHA) reference sample.

3. The article of claim 1, wherein upon decomposition the composition demonstrates a reduction of concentration of acidic byproducts after enzymatic degradation as compared with a 100% pure poly(lactic acid) (PLA) reference sample.

4. The article of claim 1, wherein the organic is a bamboo powder having a mesh size of 1500 to 2000.

5. The article of claim 1, wherein the composition has an average tensile strength greater than 15 MPa as determined by ISO 179-1 and the organic is a bamboo powder having a mesh size of 2000.

6. The article of claim 1, wherein the composition is non-reactive with one or more solvents selected from water, dimethicone, glycerin, ethyl alcohol, or combinations thereof.

7. The article of claim 1, wherein the composition consists of:

from 85 wt % to 95 wt % PHA; and from 5 wt % to 15 wt % bamboo powder.

8. The article of claim 1, wherein the article includes a plurality of pellets suitable for forming processes.

9. The article of claim 1, wherein the article is a packaging container.

10. The article of claim 1, wherein the article has a shelf life of greater than 12 months according to ISO/TR 18811.

11. The article of claim 1, wherein the article has a shelf life of greater than 36 months according to ISO/TR 18811.

12. The article of claim 1, wherein the article is non-toxic to the environment when disposed at end of life cycle, and wherein the article demonstrates a decomposition rate greater than that of a 100% polyhydroxyalkanoates (PHA) reference sample.

13. The article of claim 1, wherein the article is monolithic.

14. The article of claim 1, wherein the composition has a density greater than 1.29 g/$cm^3$.

15. The article of claim 1, wherein the composition consists of the polymer and the organic.

16. The article of claim 1, wherein the organic is a bamboo powder having a mesh size of 1800 to 2000.

17. The article of claim 1, wherein the organic is a bamboo powder having a mesh size of 2000.

18. The article of claim 1, wherein the organic is a bamboo powder having a mesh size of 1000 to 1500.

* * * * *